United States Patent [19]

Kuma et al.

[11] Patent Number: 4,911,775
[45] Date of Patent: Mar. 27, 1990

[54] METHOD OF MANUFACTURING DEHUMIDIFIER ELEMENT

[75] Inventors: Tosimi Kuma; Hiroshi Okano, both of Fukuoka, Japan

[73] Assignee: Kabushiki Kaisha Seibu Giken, Fukuoka, Japan

[21] Appl. No.: 214,456

[22] Filed: Jul. 1, 1988

Related U.S. Application Data

[63] Continuation-in-part of Ser. No. 852,291, Apr. 15, 1986, abandoned.

[30] Foreign Application Priority Data

Apr. 22, 1985 [JP] Japan .................................. 61-86969

[51] Int. Cl.$^4$ .............................................. B31F 1/22
[52] U.S. Cl. ..................................... 156/208; 156/205; 427/344; 427/397.7; 427/397.8
[58] Field of Search ............... 156/205, 208, 472, 471; 106/74; 502/407, 425, 410, 415; 165/8, 89; 210/493.4, 497.1, 502.1; 55/388, 389, 390, 387; 427/344, 397.7, 397.8

[56] References Cited

U.S. PATENT DOCUMENTS

| | | | |
|---|---|---|---|
| 2,698,062 | 12/1954 | Veltman | 502/405 X |
| 3,499,788 | 3/1970 | Golav | 427/344 X |
| 3,499,812 | 3/1970 | Glav | 427/344 X |
| 3,726,706 | 4/1973 | Glav | 427/344 X |
| 4,534,775 | 10/1985 | Frazier | 55/387 X |

Primary Examiner—Michael W. Ball
Assistant Examiner—Jeff H. Aftergut
Attorney, Agent, or Firm—Staas & Halsey

[57] ABSTRACT

A dehumidifier element is produced by alternately laminating corrugated paper and flat liner paper, both papers being of low density and composed of inorganic fiber such as ceramic fiber, to form a honeycomb matrix having many small channels penetrating through opposite surfaces. The formed matrix is fired with hot air to remove organic substances contained in the sheets, or the sheets may be fired before the lamination. The matrix is impregnated with water glass after the laminating process, or the sheets are impregnated before the laminating process. In either case, the formed matrix is soaked in an aqueous solution of aluminum sulphate or magnesium sulphate to form a silicate hydrogel on the papers and in the apertures between fibers of the papers. The shaped matrix and the metal silicate hydrogel are washed and dried to obtain a dehumidifying element having physical strength. The metal sulphate solution is cooled to precipitate and remove sodium sulphate from the solution. Additional sulphate is added to the metal sulphate solution for repeating the manufacturing process for another dehumidifier element. The main constituent of the element is metal silicate aerogel deposited in the apertures between the fibers of the inorganic fiber paper and on the inorganic fiber paper, which acts as an adsorbent.

5 Claims, 5 Drawing Sheets

METHOD OF MANUFACTURING DEHUMIDIFIER ELEMENT

RELATED APPLICATIONS

The present application is a continuation-in-part of application Ser. No. 852,291 filed Apr. 15, 1986, now abandoned.

The present application is related in subject matter to copending U.S. patent application Ser. No. 021,212 filed Mar. 3, 1987, now abandoned.

BACKGROUND OF THE INVENTION

1. Field of the Invention

This invention relates to a method of manufacturing a dehumidifier element for continuously obtaining dehumidified gas such as dry air by passing feed gas and desorbing gas alternately through the element. The element consists of a block with many small channels and having a solid adsorbent capable of reversibly adsorbing the humidity formed thereon.

2. Description of the Related Art

In our Japanese Patent Application No. 206849/1984, a method of manufacturing a humidity exchanger element including a dehumidifier element has been proposed, in which layered sheets of low density paper of inorganic fiber, such as ceramic fiber, are formed in a block with many small channels. The sheets or block are impregnated with water glass solution before or after the block-forming process and then heated and dried until the water glass solution is concentrated to hydrated water glass of 3–20% water content, after which the block is soaked in acid solution so that water glass and acid react to produce silica hydrogel. The block is thereafter washed and dried to obtain a strong element for a humidity exchanger consisting mainly of silica aerogel with the matrix of inorganic fiber paper. In this method, strong silica aerogel is stuck firmly to not only th surface of the inorganic fiber paper but also the apertures between the fibers of the paper, resulting in an element having greater physical strength and improved humidity adsorbing ability than would adhering powdered silica aerogel, which is available on the market, to inorganic fiber paper.

Aerogels providing humidity or gas adsorbing action include activated carbon, and adsorbents of the alumina-gel and silica-alumina-gel group.

SUMMARY OF THE INVENTION

It is an object of the present invention to provide a method of manufacturing a dehumidifier element having improved durability and high efficiency, wherein, relying on the fact that adsorbents consisting of aerogels of metal silicates such as the above-mentioned aluminum silicate are easily produced by the reaction of water glass and a metal salt solution, such as aluminum salt, a strong honeycomb structure of metal silicate aerogel is formed on a porous sheet matrix of inorganic fiber.

In the present invention, a sheet of material of very low density paper (bulk density of not more than 0.5 g/cm³, and in the case of paper of 0.2 mm thickness, not more than 100 g/m²), the main constituent of which is an inorganic fiber such as ceramic fiber, is prepared. A flat sheet and a corrugated sheet of this inorganic fiber paper are laminated alternately to form a block having many small channels.

To make the paper making easier, a small amount of organic fiber such as wood pulp or organic synthetic fibers is mixed in the inorganic fiber paper. The amount of the organic fiber used amounts only to several percent by weight of the total weight o the mixed fibers. During dehumidification of the dehumidifier element, the element will be subjected to a hot and less humid desorbing air having a temperature of 120°–180° C., which enters the element, at an inlet to regenerate the element. When this occurs, the above-referred organic fiber would be apt to burn and damage the element. To prevent such a problem, the sheet or the block is treated or fired with heated air of 200°–500° C. to remove organic substances from the paper. This step can be performed before or after forming the block from the flat sheets and the corrugated sheets of inorganic fiber paper. When the sheets are laminated with an inorganic adhesive such as water glass, the effect of firing before lamination is same as that after lamination; but when the sheets are laminated with an organic polymer adhesive such as polyvinyl acetate, epoxy resin and ethylene-vinyl acetate copolymer, the firing should be performed after the lamination to remove this organic adhesive as well as the other organic constituents.

The flat sheets and the corrugated sheets are impregnated with sodium silicate water glass solution and heated to dry so that the water glass solution is concentrated on the sheets. This can be performed before or after the laminating step. The laminated and water glass impregnated block is soaked in a metal sulphate solution, the solution selected from the group consisting of an aluminum sulphate solution and a magnesium sulphate solution. The reaction of the water glass and the metal sulphate produces metal silicate hydrogel without breaking the original form of the block. That is, the many small channels remain intact. Excess metal sulphate and metal silicate hydrogel not supported on the inorganic fiber paper are removed by washing the block. Then, the block is heated until dry to obtain a strong honeycomb-type element for a dehumidifier in which metal silicate aerogel, the main constituent, is firmly combined with the matrix of inorganic fiber paper.

In this method, the loss of water glass dissolved in the metal sulphate solution is prevented by heating the block after the impregnation of the block with water glass and before the impregnation of the block with metal sulphate solution. This concentrates the water glass solution, forming hydrated water glass or half-solid state water glass having 5–45% water content.

BRIEF DESCRIPTION OF THE DRAWINGS

The drawings show examples of the present invention.

DESCRIPTION OF THE PREFERRED EMBODIMENTS

Figure 1:
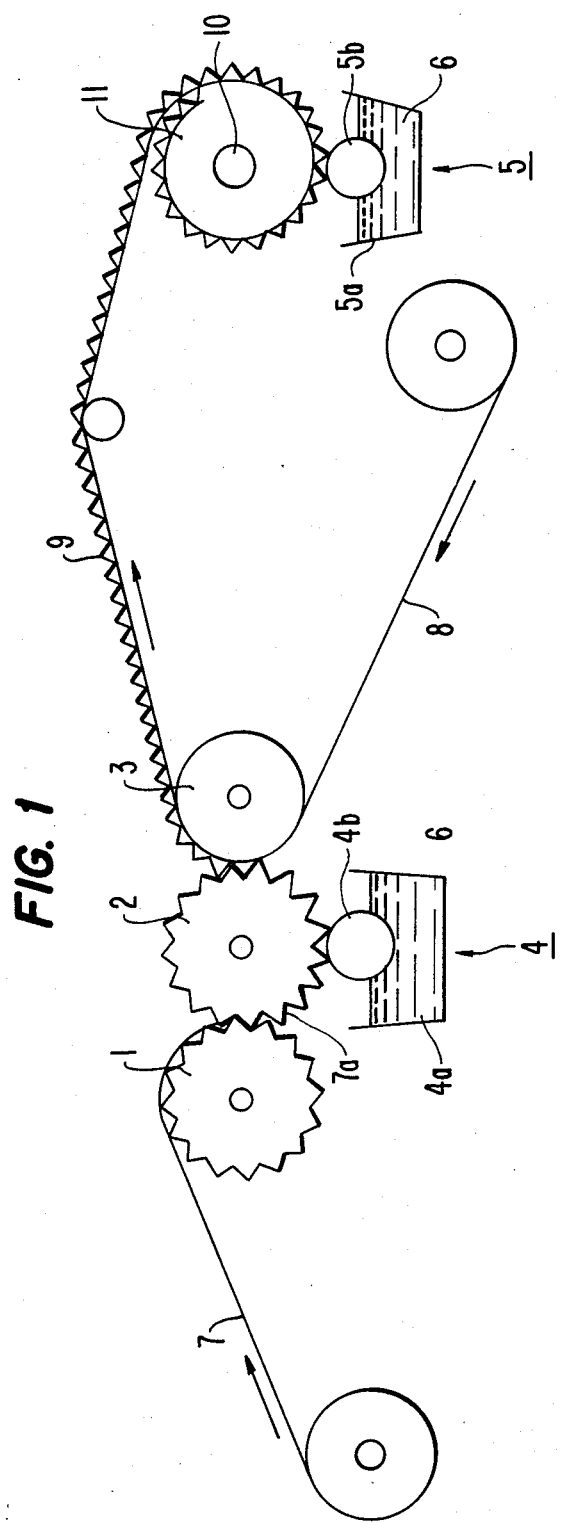
FIG. 1 is a cross-sectional view of a device for carrying out the first process of the present invention.

A pair of corrugated rollers 1 and 2 having desired teeth on the outer peripheries mesh with each other as shown in FIG. 1. A pressure roller 3 having a smooth cylindrical surface is urged against corrugated roller 2. Two adhesive applicators 4 and 5 include adhesive vessels 4a and 5a and adhesive applicator rollers 4b and 5b, respectively. The lower parts of adhesive applicator rollers 4b and 5b are dipped in an adhesive 6 stored in the respective adhesive vessels 4a and 5a. The main ingredient of the adhesive 6 is preferably water glass. The adhesive applicator roller 4b is mounted close to the corrugated roller 2.

Rolls of very porous papers 7 and 8 are provided. The papers 7 and 8 are made of ceramic fiber 70–90%, pulp 5–20% and binder 5–10%, and have a thickness of 0.1–0.5 mm and a density of not more than 0.5 g/cm$^3$.

Figure 2:
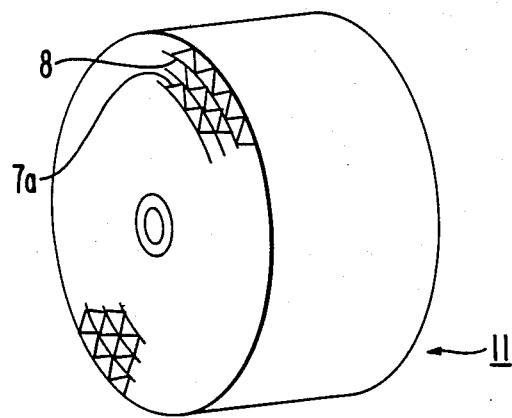
FIG. 2 is a perspective view showing a first embodiment of a dehumidifier element formed according to the present invention.

The paper 7 is applied between corrugated rollers 1 and 2 to form corrugated paper 7a. The corrugated paper 7a is supplied into the engaging portion of the corrugated roller 2 and the adhesive applicator roll 4b, and the adhesive 6 is applied to the ridged portion of the corrugated paper 7a. The corrugated paper 7a and the flat liner paper 8 are brought together between the corrugated roller 2 and the pressure roller 3 to obtain a single-faced corrugated sheet 9 by bonding the papers 7a and 8 together. The adhesive 6 is applied to the ridged portion of the single-faced corrugated sheet 9 by the applicator roller 5b of the adhesive applicator 5. By bonding and winding the glued corrugated sheet 9 around a shaft 10, a cylindrical honeycomb matrix 11 as shown in FIG. 2 having many small channels through both ends is fabricated.

The cylindrical honeycomb matrix 11 is treated or fired with heated air having a temperature of 200°–500° C. to remove organic substances in the paper and the adhesive.

The fired cylindrical honeycomb matrix 11 is soaked in a 20–35% aqueous solution of No. 1 water glass (silicon oxide 2.1: sodium oxide 1) and dried at 80°–100° C. for one hour. A honeycomb matrix having a hydrated or half-solid state water glass layer containing 5–45% water by weight and being 2–2.5 times the mass of the paper matrix is obtained. The honeycomb is soaked in 21% aqueous solution of aluminum sulphate with stirring, to produce aluminum silicate hydrogel on the paper. Sodium sulphate (a by-product), excess aluminum sulphate and aluminum silicate hydrogel not supported on the paper are removed by washing. By heating and drying the honeycomb, a dehumidifier element, the main constituent of the same being aluminum silicate aerogel, is obtained.

In the example mentioned above, after the cylindrical honeycomb matrix 11 is soaked in the aqueous water glass solution and heated to dry the water glass solution, it is soaked in the aluminum sulphate solution. As another example, fired ceramic fiber papers 7 and 8 are soaked in a water glass solution and dried to a suitable water content so that the surface becomes somewhat sticky before the corrugating process. In this process, a part of the somewhat sticky water glass can be used as the adhesive in the producing process of the single-faced corrugated sheet 9. This cylindrical honeycomb 11 is dried again and is soaked in an aluminum sulphate solution to produce aluminum silicate hydrogel.

Papers to be used for forming the matrix are inorganic fiber papers, the main constituent of which are not only the above-mentioned ceramic fiber, but also can be glass fiber, slag fiber, rock fiber, carbon fiber and mixtures thereof. Asbestos fibers are not preferable, because the asbestos fibers become fixed in lungs and prolonged exposure to asbestos fibers is known to cause lung cancer, a special swelling in the breast or at the peritoneum and/or asbestosis.

TABLE 1

WATER GLASS ($Na_2O.nSiO_2.xH_2O$)
(Japanese Industrial Standard)

|  | No. 1 | No. 2 | No. 3 |
|---|---|---|---|
| Specific Gravity (15° C. Be) | — | ≧54 | ≧40 |
| $SiO_2$ % | 35–38 | 34–36 | 28–30 |
| $Na_2O$ % | 17–19 | 14–15 | 9–10 |
| Fe % | ≦0.03 | ≦0.03 | ≦0.02 |
| Water-insoluble % | ≦0.2 | ≦0.2 | ≦0.2 |

As water soluble aluminum salts, aluminum sulphate, aluminum nitrate, primary aluminum phosphate and aluminum chloride are used, which can be easily obtained on the market at reasonable prices. Since water-soluble calcium salts and magnesium salts such as calcium nitrate, calcium chloride, magnesium sulphate and magnesium chloride, also react with water glass to produce silicate gels, the above-mentioned salts of Al, Ca and Mg were tried in the experiment.

Figure 3:
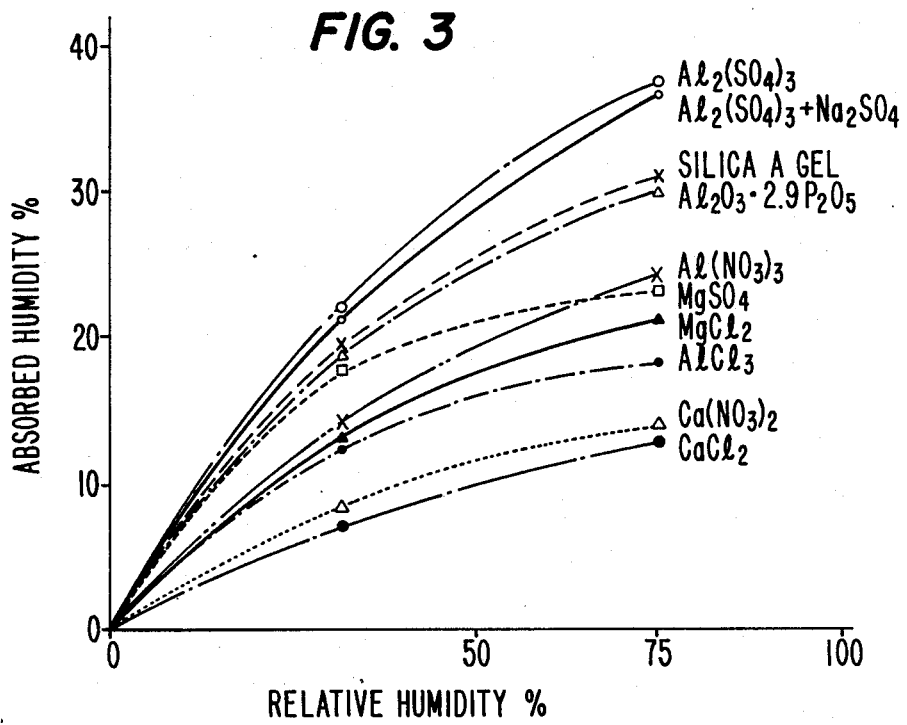
FIGS. 3 and 7 are graphs showing a comparison of dehumidifying abilities between elements formed according to the present invention and those formed according to an existing method.

FIG. 3 shows the equilibrium amounts of vapor adsorbed at a normal temperature (25° C.) by silica A gel, which is available on the market, and by the silicate gels of the present invention. Examples for comparison are produced by th reaction of hydrated water glass with 20% solution of aluminum sulphate, primary aluminum phosphate, aluminum nitrate, aluminum chloride, calcium nitrate, calcium chloride, magnesium sulphate and magnesium chloride heated at 60°–70° C. The equilibrium amounts of adsorbed vapor by these aerogels at a relative humidity of 75% are as shown in Table 2 below:

TABLE 2

| using aluminum sulphate | 37.6% |
|---|---|
| silica A gel on the market | 31.0% |
| using primary aluminum phosphate | 30.1% |
| aluminum nitrate | 23.7% |
| magnesium sulphate | 23.5% |
| magnesium chloride | 18.7% |
| aluminum chloride | 17.2% |
| calcium nitrate | 13.9% |
| calcium chloride | 13.0% |

Silica A gel is the general silica gel and has strong moisture-adsorbing ability. Silica B gel is a silica gel having low surface area, and adsorbs large amounts of moisture at high humidities.

Properties of silica A gel and of silica B gel on the market are shown in Table 3 below:

TABLE 3

|  | A gel | B gel |
|---|---|---|
| Specific gravity | 2.2–2.3 | 2.2–2.3 |

TABLE 3-continued

|  | A gel | B gel |
|---|---|---|
| Bulk density (kg/m$^3$) | 650–850 | 700–800 |
| Porosity | 0.4–0.45 | 0.5–0.6 |
| Specific surface area (m$^2$/g) | 500–750 | 250–350 |
| Mean pore diameter (Å) | 20–30 | 50–60 |
| Moisture adsorbing rate (%) at relative humidity of | | |
| 20% | 10–13 | 4–6 |
| 50% | 25–30 | 7–16 |
| 90% | 34–40 | 40–75 |

As indicated above and in FIG. 3, aluminum salts, except for aluminum chloride and magnesium sulphate, show a humidity adsorbing ability as remarkable as silica A gel sold on the market and are efficient enough to be used in dehumidifiers. Other magnesium salts and calcium salts are not efficient enough to be used in dehumidifiers. Among aluminum salts, aluminum chloride shows low humidity adsorbing ability compared with the other aluminum salts. It is possibly because aluminum chloride was hydrolyzed and therefore the aluminum silicate-gel producing reaction was not enough.

Sodium sulphate is produced as a by-product when the matrix is soaked in a water glass solution and treated with aluminum sulphate. When aluminum sulphate is added one after another to the same mother liquid, the proportion of sodium sulphate in the liquid increases. In order to see its effect, a similar test was conducted using a solution containing 19% of aluminum sulphate and 8.5% of sodium sulphate. As a result, shown as $Al_2(SO_4)_3 + Na_2SO_4$ in FIG. 3, exactly the same result was obtained as when only aluminum sulphate was used, and it was made clear that, even if the quantity of sodium sulphate increases in the mother liquid, it does not at all affect the quality of the element obtained.

Figure 4:
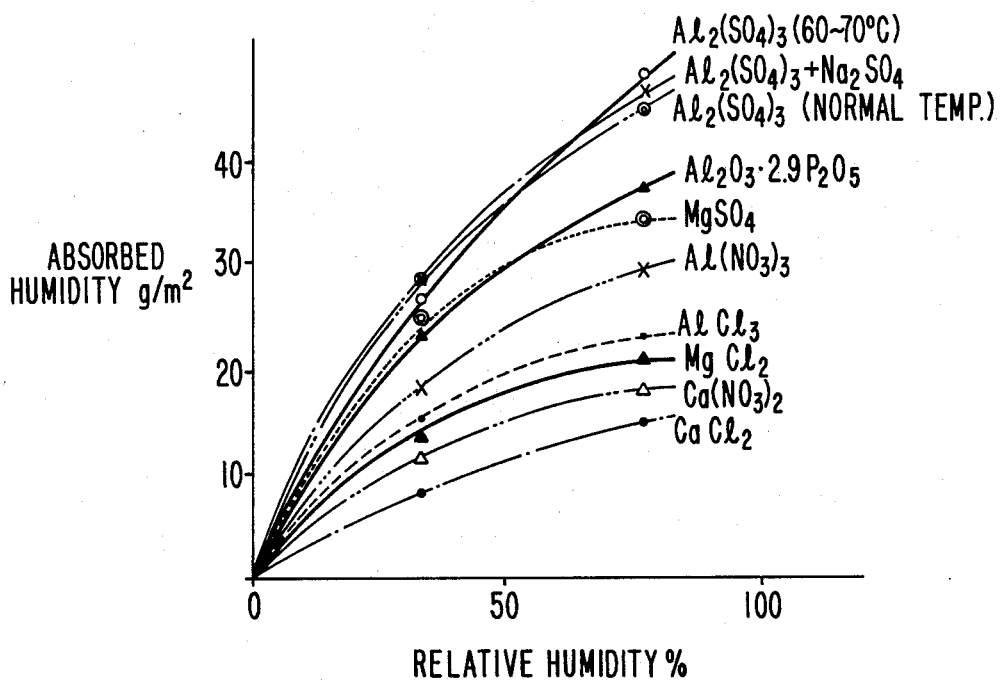
FIGS. 4 and 5 are graphs showing the dehumidifying abilities of the various elements formed according to the present invention.

FIG. 4 shows the equilibrium amount of adsorbed vapor at 25° C. per square meter of the ceramic fiber paper mentioned above in the example, on which adsorbent gel is fixed by being similarly impregnated with water glass, and then with aluminum sulphate solution of 60°–70° C. and of normal temperature, and with 19–21% solutions of aluminum chloride, of primary aluminum phosphate, of aluminum nitrate, of magnesium sulphate, of magnesium chloride, of calcium nitrate, and of calcium chloride of 60°–70° C., and with a solution containing 19% of aluminum sulphate and 8.5% of sodium sulphate of 60°–70° C.

Figure 5:
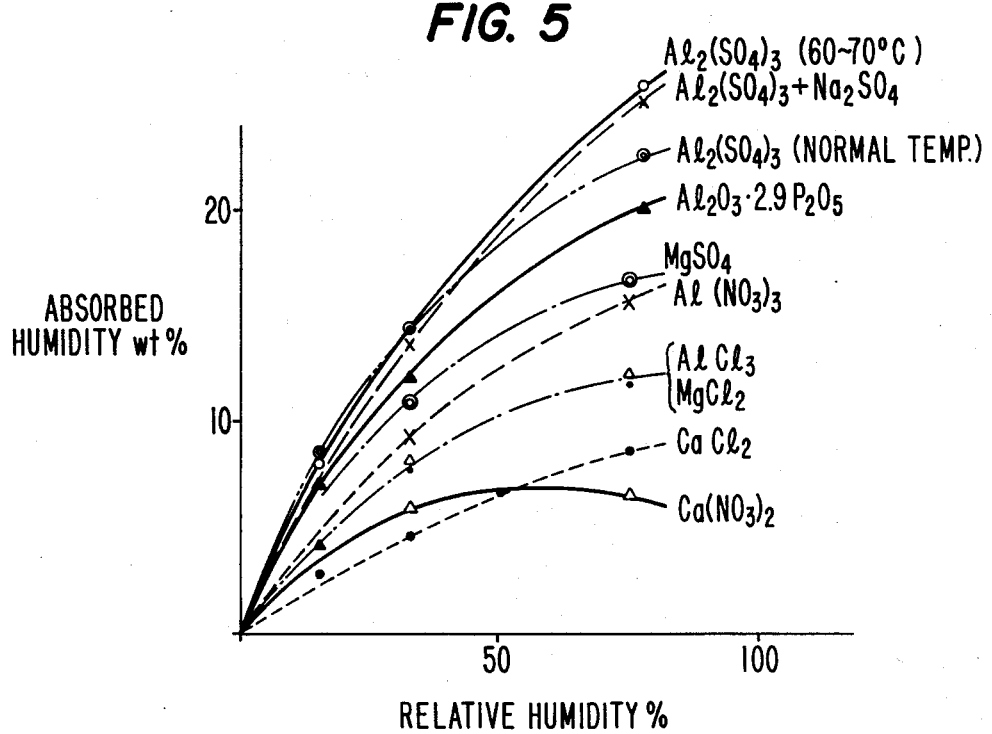

FIG. 5 shows the equilibrium amounts (weight %) of adsorbed vapor at 25° C. in dehumidifier elements manufactured according to the above examples by the reaction of water glass with aluminum sulphate solutions of 60°–70° C. and of normal temperature, solutions of 60°–70° C. of primary aluminum phosphate, aluminum nitrate, aluminum chloride, magnesium sulphate, magnesium chloride, calcium chloride, calcium nitrate, and aluminum sulphate-sodium sulphate mixture, all of the same concentrations as mentioned above.

When the method of manufacturing a dehumidifier element of the present invention is used for mass production, metal salts such as aluminum sulphate should be added to the same mother liquid successively and by-products such as sodium sulphate should be removed from the mother liquid by cooling successively. In the case of using sodium silicate as water glass, the reaction to form metal silicate hydrogel are shown in Table 4 below:

TABLE 4

| $Na_2SiO_3 + Al_2(SO_4)_3$ | → | $Al_2(SiO_3)_3 + Na_2SO_4$ |
| $Na_2SiO_3 + Al(H_2PO_4)_3$ | → | $Al_2(SiO_3)_3 + Na_3PO_4$ |
| $Na_2SiO_3 + AlCl_3$ | → | $Al_2(SiO_3)_3 + NaCl$ |
| $Na_2SiO_3 + Al(NO_3)_3$ | → | $Al_2(SiO_3)_3 + NaNO_3$ |
| $Na_2SiO_3 + MgSO_4$ | → | $MgSiO_3 + Na_2SO_4$ |
| $Na_2SiO_3 + MgCl_2$ | → | $MgSiO_3 + NaCl$ |
| $Na_2SiO_3 + Mg(NO_3)_2$ | → | $MgSiO_3 + NaNO_3$ |

Magnesium phosphate is water insoluble and cannot be used, of the above-mentioned seven salts, aluminum phosphate is rather high-priced, rendering its use is impractical, and water soluble salts of aluminum and magnesium only are available at a reasonable price of the remaining six salts. Water solubility (weight %) of the six salts and water solubility of the three by-products of the reaction of the six salts and sodium silicate at 60° C. (temperature at the reaction) and at 0° C. (cooling temperature for precipitation and removal of by-products) are indicated in Table 5.

TABLE 5

|  | 60° C. | 0° C. |
|---|---|---|
| $Al_2(SO_4)_3$ | 31.0 | 27.5 |
| $MgSO_4$ | 35.3 | 18.0 |
| $Na_2SO_4$ | 31.1 | 4.3 |
| $AlCl_3$ | 32.3 | 30.5 |
| $MgCl_2$ | 37.9 | 34.6 |
| NaCl | 27.1 | 26.3 |
| $Al(NO_3)_3$ | 51.5 | 37.5 |
| $Mg(NO_3)_2$ | 47.7 | 38.4 |
| $NaNO_3$ | 55.4 | 42.2 |

Solubilities of NaCl and of $NaNO_3$ in water are high at low temperatures and change only a little with temperature changes, and also have only a small difference with those of $AlCl_3$, $MgCl_2$ and of $Al(NO_3)_3$, $Mg(NO_3)_2$ respectively; therefore, NaCl and $NaNO_3$ cannot be precipitated and removed with the cooling of mother liquids after the reaction.

Solubility of $Na_2SO_4$ is high in warm water and low in cold water, and solubilities of $Al_2(SO_4)_3$ and of $MgSO_4$ are high in cold water as well as in warm water; therefore, $Na_2SO_4$ only can be precipitated and removed from the mother liquids containing $Na_2SO_4$ and $Al_2(SO_4)_3$ or containing $Na_2SO_4$ and $MgSO_4$ by cooling the mother liquids after reacting sodium silicate and the metal sulphate.

There is potassium silicate in the compounds called as water glass in the wide sense. This potassium silicate has also been checked for whether it can be used as "water glass" in the present invention.

The water-solubilities of the by-products produced by the reaction of potassium silicate and the above-mentioned six metal salts at 60° C. and 0° C. are given below in Table 6:

TABLE 6

|  | 60° C. | 0° C. |
|---|---|---|
| $K_2SO_4$ | 15.4 | 7.2 |
| KCl | 31.4 | 21.9 |
| $KNO_3$ | 52.2 | 11.7 |

It is supposed that $K_2SO_4$ only can be probably precipitated and removed from the mother liquid, but potassium silicate is pretty high-priced and not preferable.

Figure 6:
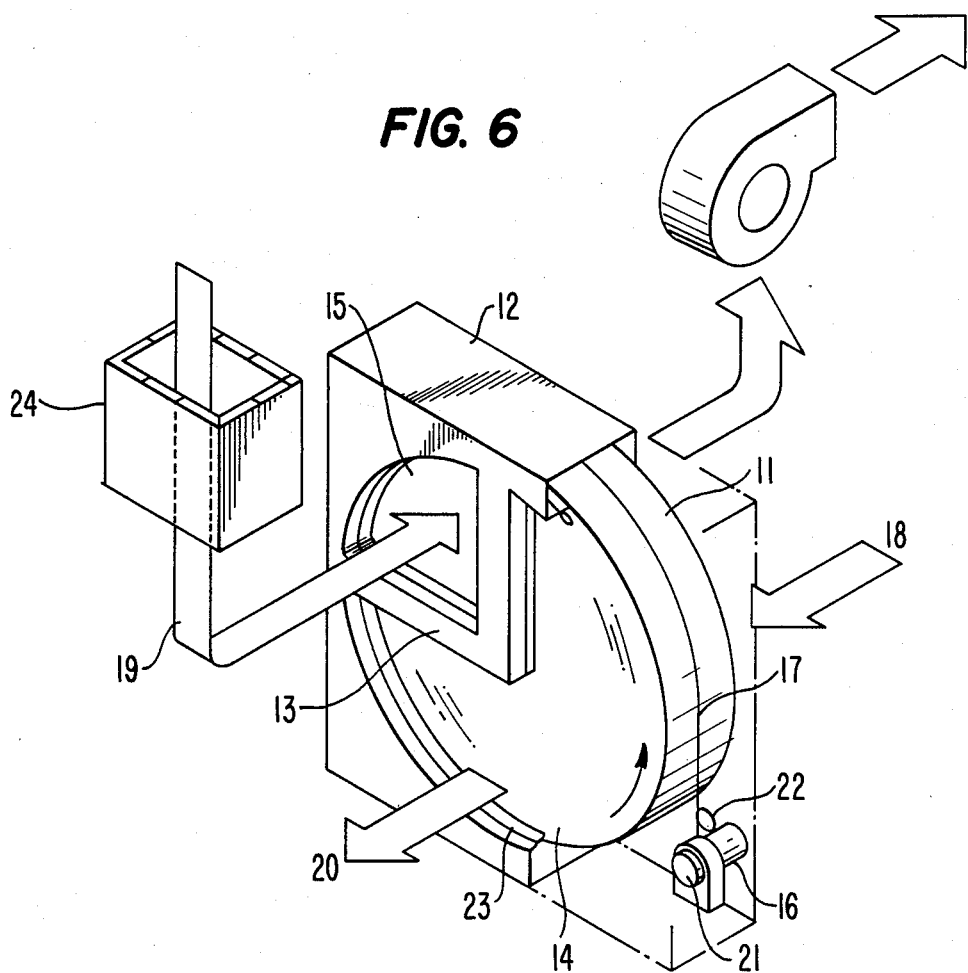
FIG. 6 is a perspective view of a dehumidifier using the element illustrated in FIG. 2, a portion of the structure being broken away for the purpose of illustration.

FIG. 6 shows how a dehumidifier is built with the cylindrical dehumidifier element 11 shown in FIG. 2. The dehumidifier element 11 is held rotably in a casing 12 which is divided into a processing zone 14 and a regenerating zone 15 by a separator 13, and is rotated by a geared motor 16 and a driving belt 17. Highly humid feed air 18 is sent into the processing zone 14, and water vapor is adsorbed by the element 11 therefrom. Hot and less humid desorbing air 19 is sent into the regenerating zone 15 to regenerate and dehumidify the element 11. Dry air 20 is thus continuously obtained. In FIG. 6, 21 is a pulley, 22 is a tension pulley, 23 is a rubber seal and 24 is a heater for the desorbing air.

Figure 7:
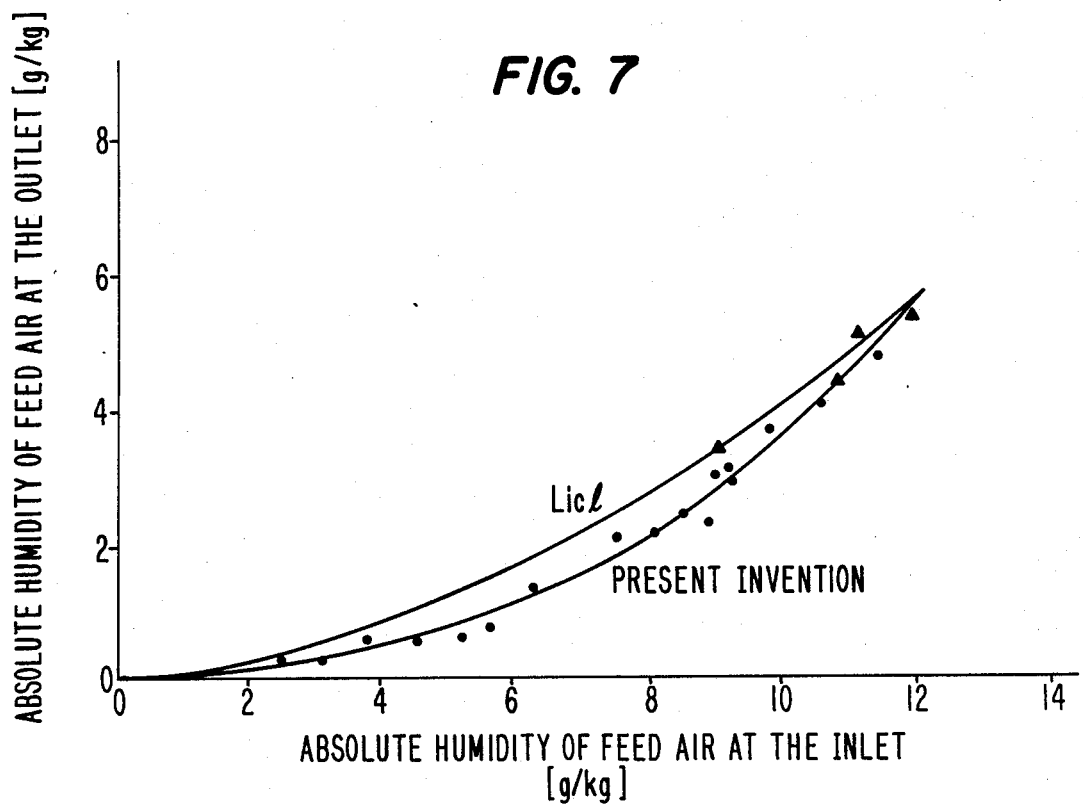

For comparison purposes, dehumidifiers of the structure shown in FIG. 6 were built using two different dehumidifier elements. One was obtained, according to the examples presented above, by forming ceramic fiber paper as shown in FIG. 1 into the single-faced corrugated sheet 9 having a wave length of 3 mm and a wave height of 2 mm, firing or treating with air having a temperature of 200°–500° C., rolling the corrugated sheet up to a diameter of 320 mm and a thickness of 200 mm, and then soaking the rolled matrix in a water glass solution and in an aluminum sulphate solution. The second dehumidifier is an absorbing element, an was obtained by forming the same ceramic fiber paper in the same size in accordance with the present invention, and then impregnating it with 8% (weight % of the formed block) of lithium chloride as an absorbent. FIG. 7 shows the relation of absolute humidities (g/kg) of feed air 18 at the inlet and at the outlet with 2 m/sec wind velocity of the air 18 and of the desorbing air 19 in front of the element, with a ratio of 1 to 3 of the flow amounts of the desorbing air and the feed air during a given period of time, with an 18 r.p.h. rotating speed of the element, with a feed air temperature of 20° C. at the inlet and with a desorbing air temperature of 140° C. at the inlet, the absolute humidity of desorbing air at the inlet being the same as the absolute humidity of the feed air at the inlet.

As is made clear from the above, sufficient adsorbing ability for a dehumidifier element is obtained, and large numbers of dehumidifier element can be manufactured successively, when aluminum sulphate or magnesium sulphate is used. When aluminum chloride, magnesium chloride or calcium salts are used elements obtained are not efficient enough to be used as dehumidifiers, though they can be used as total heat energy exchangers.

It is also apparent that water glass, which has a high chemical affinity with inorganic fiber, not only moistens the surface of the inorganic fiber paper but also permeates into the apertures between the fibers of the inorganic fiber paper, and then reacts with water-soluble aluminum sulphate or magnesium sulphate to produce a gel of silicates. The silicate hydrogels are therefore tightly bound even to the inside of the low density inorganic fiber paper. When water glass reacts with metal sulphates after the impregnated water glass is concentrated and dried to form hydrated water glass or half-solid state water glass of 5–45% of water content, the content of $SiO_2$ in the water glass before it changes into gel is 50–70% and the water content of silicate hydrogel obtained becomes 40–50%; therefore, the gel is strong, the binding strength of the gel to the inorganic fiber paper is sufficient and there is no possibility of the hydrogel bound to the inorganic fiber paper falling off because of washing with water after the reaction. Moreover, the hydrogel produced in this way is dried to form an aerogel having 40–50% volume of minute pores, and it scarcely shrinks during drying; therefore, the aerogel has no cracks and it cannot break into small pieces.

Thus, a strong aerogel tightly bound to the paper is obtained.

It is also apparent that, as the organic substances in the honeycomb matrix are removed by the firing process, the dehumidifier element of the present invention can be safely used for the continuous dehumidification of air or other inert gases, in which the element is regenerated by introducing a hot regeneration air to desorb the adsorbed humidity, while precluding the possibility of combustion of the element with the high temperature regeneration air.

In prior dehumidifier elements, organic or inorganic adhesives having no humidity adsorbing abilities were used in the forming process. The part of the element coated with adhesive did not at all contribute to the humidity adsorbing performance, and the effective surface area of the element was lessened by 10–20%. But in the present invention, water glass can be used as an adhesive in the laminating process to form the matrix, which converts into silicate aerogel together with the water glass impregnated all over the element by the reaction with metal sulphates, without decreasing adhering solidity of inorganic fiber paper in the element. Thus, the humidity adsorbing performance of the element is 10–20% better than the prior one.

The dehumidifier element obtained by the present invention shows, from the above data, excellent humidity adsorbing performance. At the same time, it has many characteristics such that it can be manufactured in mass production with inexpensive materials easily and reliably.

Figure 9:
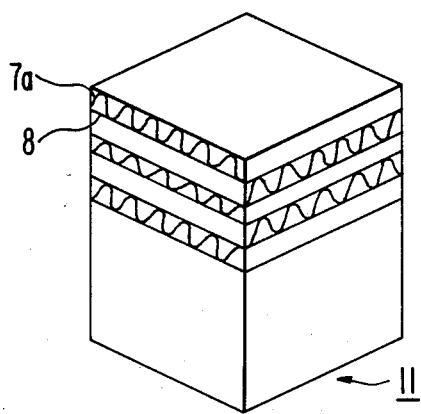
FIG. 9 is a perspective view showing an example of a counterflow type element.
Figure 10:
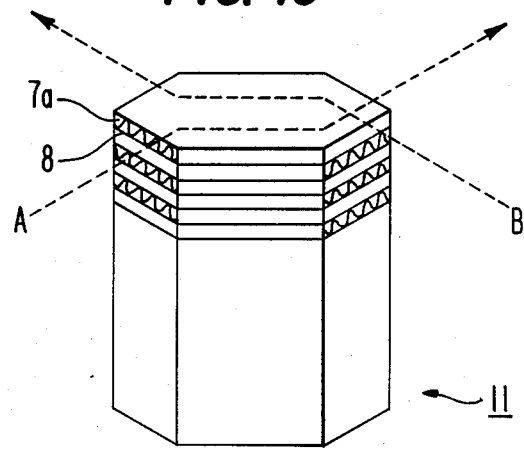
Figure 8:
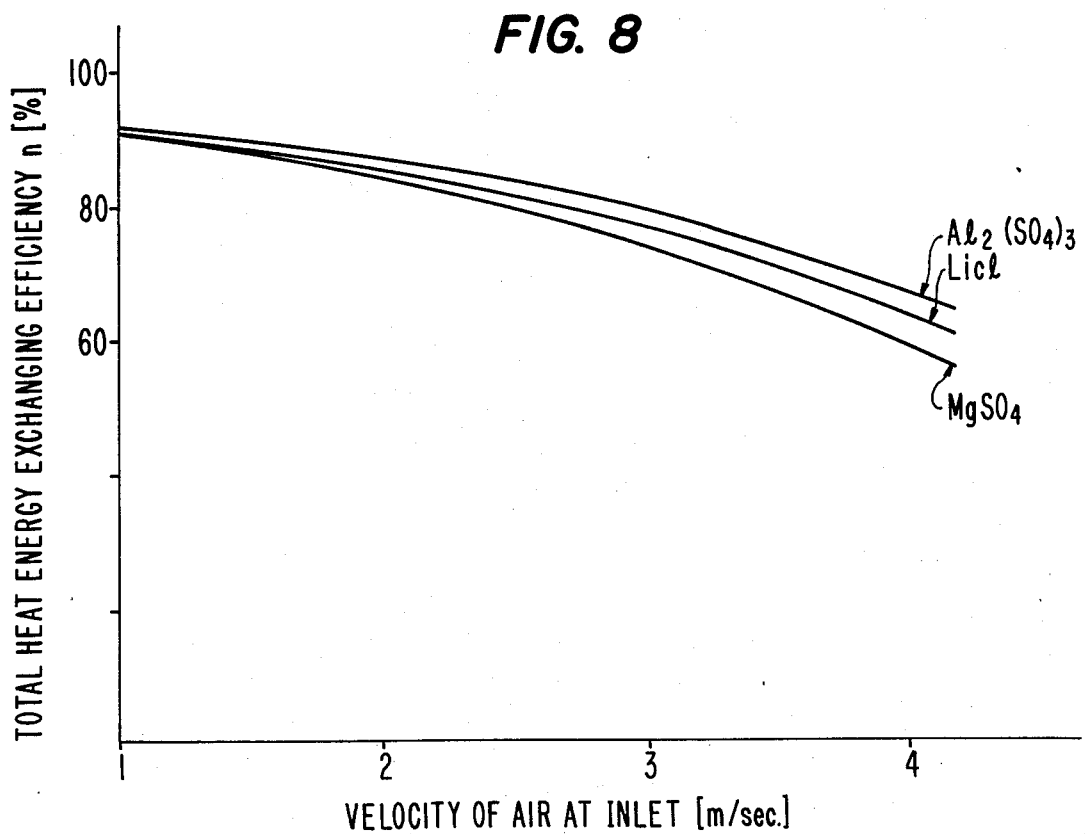
FIG. 8 is a perspective view showing an example of a crossflow type element.

The dehumidifier element in the present invention can be formed not only into the rotary type element shown in FIG. 2, but also into the cross-flow type element shown in FIG. 8 and into the counter-flow type element shown in FIG. 9.

What is claimed:

1. A method of manufacturing a dehumidifier element comprising the steps of:
   (a) alternately laminating a flat sheet and a corrugated sheet of low density papers, the main constituent of the papers being inorganic fiber selected from the group consisting of ceramic fiber, glass fiber, rock fiber, carbon fiber, slag fiber and mixtures of not less than two of said fibers, to form a honeycomb matrix having many small channels;
   (b) heating the matrix to a temperature of 200°–500° C. to remove organic substances contained in the matrix and to decrease the density of sheets;
   (c) impregnating the matrix with an aqueous solution of sodium silicate water glass;
   (d) heating and drying the impregnated matrix so that the sodium silicate water glass becomes hydrated water glass or half-solid state water glass;
   (e) soaking the matrix in an aqueous solution of metal sulphate selected from the group consisting of aluminum sulphate and magnesium sulphate to react with the sodium silicate water glass to form silicate hydrogel on the sheets in the matrix and in the apertures between fibers in the sheets;
   (f) washing and drying the matrix to change the silicate hydrogel into silicate aerogel and to obtain the dehumidifier element;
   (g) cooling the aqueous solution of metal sulphate to precipitate and remove sodium sulphate, which is produced as a by-product of the reaction with the sodium silicate water glass and is dissolved in the aqueous solution of metal sulphate; and (h) adding sodium silicate to the aqueous solution of sodium silicate after the reaction and adding additional metal sulphate to the aqueous solution of metal sulphate after reaction to prepare the solution to repeat said steps (c) to (e) for a next dehumidifier element to be manufactured.

2. A method of manufacturing a dehumidifier element according to claim 1, wherein the sheets are impregnated with the aqueous solution of sodium silicate water glass beforesaid laminating step.

3. A method of manufacturing a dehumidifier element according to claim 1, wherein the flat sheet and the corrugated sheet are impregnated with an aqueous solution of sodium silicate water glass and are heated to a temperature of 200°–500° C. before said laminating step.

4. A method of manufacturing a dehumidifier element according to claim 1, wherein step (a) further comprises laminating the sheets with the aqueous solution of sodium silicate water glass as an adhesive which reacts with the metal sulphate to produce silicate aerogel having adsorption activity and maintaining adhesive activity.

5. A method of manufacturing a dehumidifier element according to claim 1, wherein said heating step comprises treating the matrix with air having a temperature range of 200° C.–500° C.

* * * * *

UNITED STATES PATENT AND TRADEMARK OFFICE
CERTIFICATE OF CORRECTION

PATENT NO. : 4,911,775

DATED : March 27, 1990

INVENTOR(S) : TOSHIMI KUMA and HIROSHI OKANO

It is certified that error appears in the above-identified patent and that said Letters Patent is hereby corrected as shown below:

FRONT PAGE [56] References Cited "Golav" should be --Glav--.

Column 2, line 8, delete the period ".";
         line 13, delete the period ".".

Column 3, line 45, delete the period ".";
         line 49, "C." should be --C--.

Column 4, line 37, "C.)" should be --C)--.

Column 5, line 6, delete "500-750   250-350";
         line 7, after "($m^2/g$)" in column A gel and B gel, respectively, insert --500-750    250-350--;
         lines 39, 43, 47, 51, 54 and 55, "C." should be --C--.

Column 6, line 18, "C." should be --C-- (both instances);
         line 54, "C." should be --C-- (both instances).

Column 7, lines 18, 33 and 34, "C." should be --C--.

UNITED STATES PATENT AND TRADEMARK OFFICE
CERTIFICATE OF CORRECTION

PATENT NO. : 4,911,775

DATED : March 27, 1990

INVENTOR(S) : Toshimi Kuma, et al

It is certified that error appears in the above-identified patent and that said Letters Patent is hereby corrected as shown below:

Column 8, line 48, "C." should be --C--.

Column 9, line 11, "beforesaid" should be --before said--.

Column 10, line 2, "C." should be --C--;
        line 13, "200° C." should be --200° C--.

Signed and Sealed this

Fourth Day of June, 1991

*Attest:*

HARRY F. MANBECK, JR.

*Attesting Officer*    *Commissioner of Patents and Trademarks*